United States Patent [19]

Lambrecht et al.

[11] E Re. 28,816

[45] Reissued May 18, 1976

[54] STERN DRIVE UNIT PROPELLER TRIMMING ARRANGEMENT

[75] Inventors: Ralph E. Lambrecht; Harry Najimian, Jr., both of Lake Bluff, Ill.

[73] Assignee: Outboard Marine Corporation, Waukegan, Ill.

[22] Filed: June 14, 1974

[21] Appl. No.: 479,193

Related U.S. Patent Documents

Reissue of:

[64] Patent No.: 3,722,456
Issued: Mar. 27, 1973
Appl. No.: 177,070
Filed: Sept. 1, 1971

[52] U.S. Cl. ..... 115/41 R; 115/34 R
[51] Int. Cl.² ..... B63H 5/12
[58] Field of Search ..... 115/41 R, 41 HT, 34 R, 115/12, .5 B

[56] References Cited

UNITED STATES PATENTS

| | | | |
|---|---|---|---|
| 2,002,517 | 5/1935 | Balduf | 115/34 R |
| 2,059,220 | 11/1936 | Fernstrum | 115/.5 B |
| 3,057,320 | 10/1962 | Daniels | 115/35 |
| 3,175,530 | 3/1965 | Petterson | 115/35 X |
| 3,183,880 | 5/1965 | Shimanckas | 115/41 R |
| 3,382,839 | 5/1968 | Kiekhalfer | 115/41 R |
| 3,406,652 | 10/1968 | Mettetal | 115/41 R |
| 3,605,678 | 9/1971 | Shimanckas | 114/41 R |
| 3,641,965 | 10/1970 | Schmiedel | 115/41 HT |
| 3,844,247 | 10/1974 | Collis et al. | 115/41 HT |

*Primary Examiner*—Trygve M. Blix
*Assistant Examiner*—Gregory W. O'Connor
*Attorney, Agent, or Firm*—Michael, Best & Friedrich

[57] ABSTRACT

Disclosed herein is the combination of a boat hull and a stern drive unit which includes and is supported by an engine and which further includes a marine propulsion lower unit tiltable vertically and swingable horizontally independently of the engine, together with means mounting the stern drive unit on the boat hull including means for selectively vertically displacing or tilting the forward end of the engine relative to the rear of the engine.

33 Claims, 6 Drawing Figures

Inventors
Ralph E. Lambrecht
Harry Najimian Jr.
By Robert E. Clemency.

Fig. 4
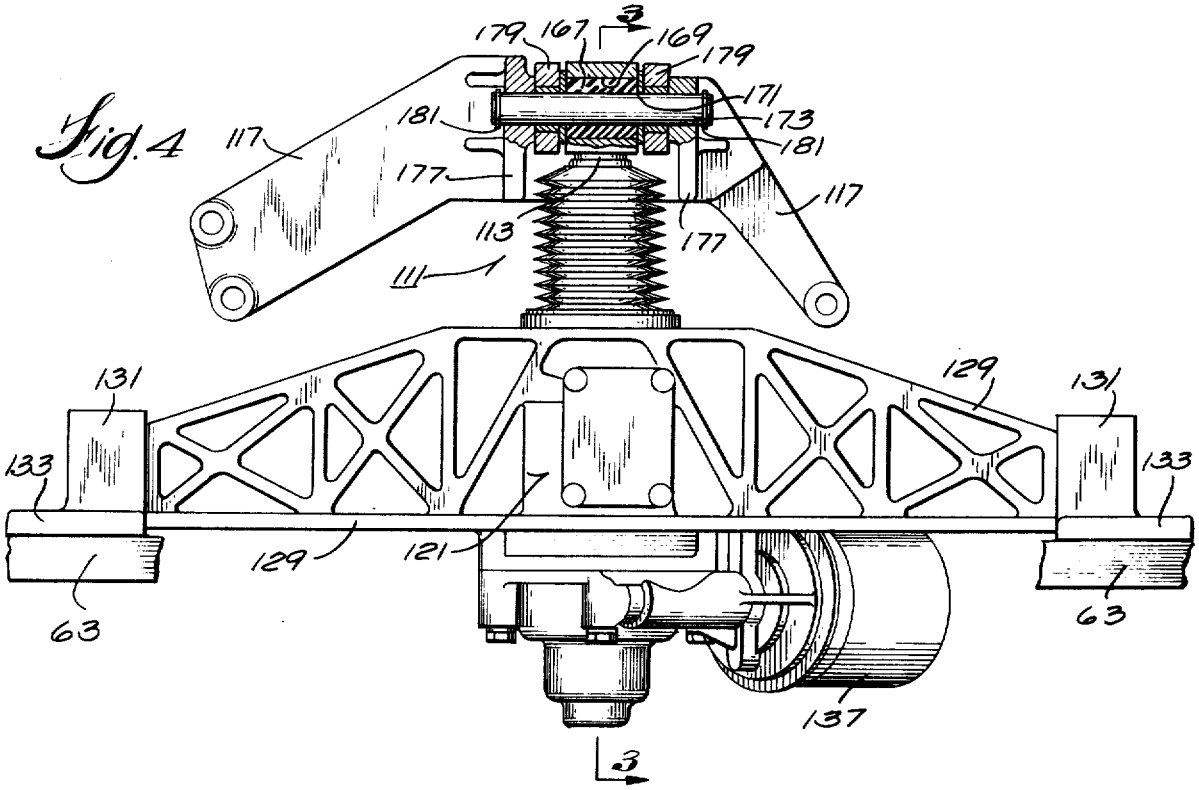
Fig. 5
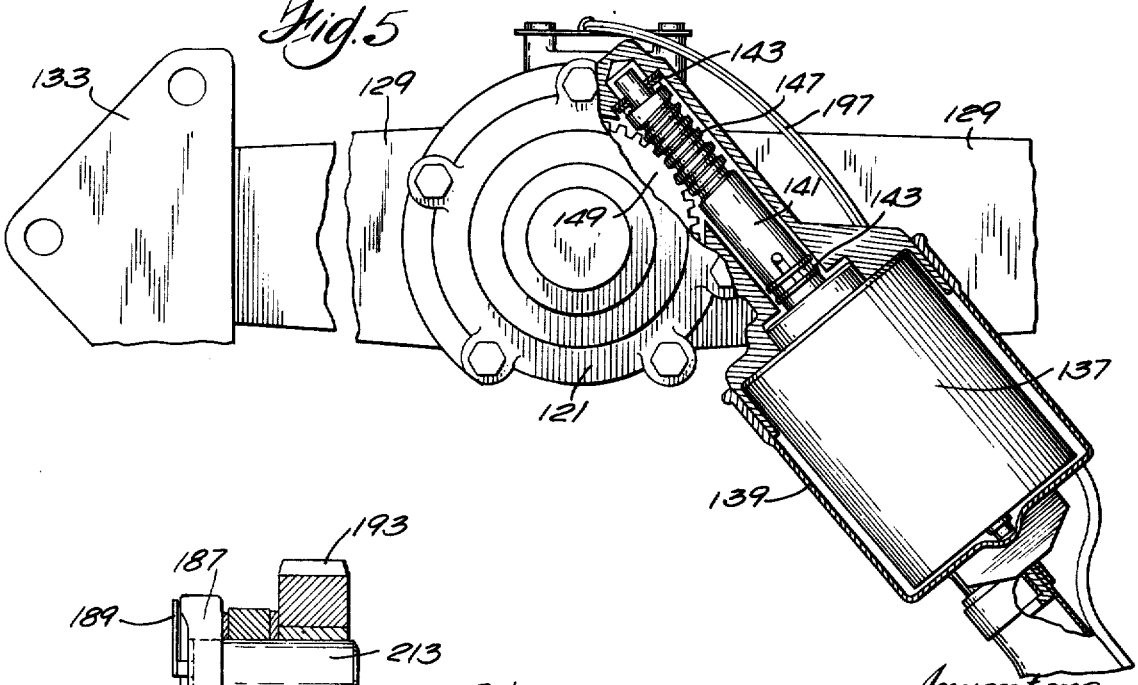
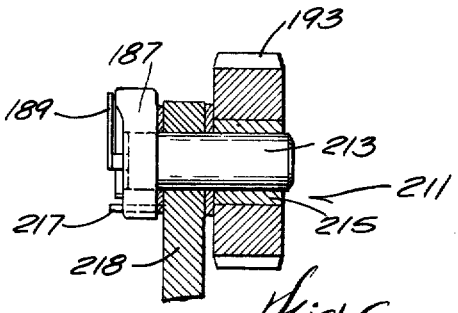
Fig. 6
Inventors
Ralph E. Lambrecht
Harry Najimian Jr.
By Robert E. Clemency
Attorney

STERN DRIVE UNIT PROPELLER TRIMMING ARRANGEMENT

Matter enclosed in heavy brackets [ ] appears in the original patent but forms no part of this reissue specification; matter printed in italics indicates the additions made by reissue.

BACKGROUND OF THE INVENTION

The invention relates generally to marine propulsion stern drive units including an engine which is mounted on a boat hull and which supports a vertically tiltable and horizontally swingable lower unit part supporting a propeller. Such lower units are desirably trimmed relative to the boat hull and thereby to the water to obtain maximum speed and safety conditions. Such trimming effects both the relation of the boat to the water and the angle at which the propeller generates propulsive thrust. Other factors are involved in the "trim" of a boat as, for instance, passenger loading and sea conditions. Thus, one particular relationship of a propulsion unit to a boat can give good results under one set of conditions and less satisfactory results under another set of conditions. Furthermore, conditions can change when under way, as for instance, if the weather or sea condition change, or if the distribution of passenger weight changes. Accordingly, it is desirable to be able to adjust the trim under way.

It should also be noted that proper trim between a lower unit and a boat is an important safety factor when under way. In this regard, for instance, a "bow-down" condition can cause violent uncontrollable action in swells.

In addition to trim, another factor of significance with respect to vertically tiltable lower units is capability to absorb shock incident to rearward and upward swinging occurring in response to the striking of an underwater obstacle and the capacity for power tilting of the propulsion unit upwardly and downwardly relative to the trimmed running position. For example, propeller removal is facilitated by tilting the lower unit to its fully raised position and shallow water operation at reduced speeds is facilitated by tilting the lower unit to a partially raised position. Power tilting in the down or return direction to the trimmed position also affords return of the lower unit after the striking of an underwater obstacle and after power tilting upwardly to partially and fully raised positions.

Various arrangements have been provided in the past for frictionally and hydraulically absorbing shock or dissipating energy in response to the striking of an underwater obstacle. In addition, various arrangements have been employed to afford power tilting of a marine propulsion lower unit between a running position and a partially or fully raised or elevated position. In addition, various hydraulic arrangements have been provided for adjusting the trim of an outboard motor relative to a boat even when under way and to afford energy absorption in response to striking of an underwater obstacle. However, all the known prior stern drive arrangements were incapable, without trim setting by the operator, of affording propulsion unit return to the same trim position after power tilting or after tilting in response to the striking of an underwater obstacle. Attention is directed to the following U.S. patents:

Ziegler Pat. No. 3,250,240 issued May 10, 1966;
Kiekhaefer Pat. No. 2,953,335 issued Sept. 20, 1960;
North Pat. No. 3,295,221 issued Nov. 15, 1966;
North Pat. No. 3,434,449 issued Mar. 25, 1969;
Woodfill Pat. No. 3,434,448 issued Mar. 25, 1969;
McCormick Pat. No. 3,434,450 issued Mar. 25, 1969.

Attention is also directed to the commonly assigned Carpenter Application Ser. No. 118,134 filed Feb. 23, 1971, and entitled "Hydraulic Power Trim and Power Tilt System for a Marine Propulsion Device".

Attention is also directed to the Shimanckas U.S. Pat. No. 3,183,880 issued May 18, 1965, and entitled "Marine Propulsion Device."

SUMMARY OF THE INVENTION

The invention provides a stern drive unit in which a stern leg is fixedly attached to an engine and in which the stern drive unit is adapted to be mounted in a boat hull in such manner as to selectively raise and lower the forward end of the engine relative to the boat hull about a rearward transverse axis to afford selective propeller trim adjustment. Also in accordance with the invention, there is provided a stern drive unit including an arrangement for selectively raising and lowering the forward end of the engine to adjust the trim of the propeller. In the preferred construction, a screw jack arrangement is employed.

Still further in accordance with the invention, a vibration isolation mount is provided between the forward end of the engine and the boat hull. In the preferred construction, such mount is located between the screw jack and the forward end of the engine. Provision is also made for affording pivotal movement between the screw jack and the engine and between the screw jack and the boat hull to accommodate trimming of the engine relative to the boat hull.

Still further in accordance with the invention, vibration isolation mounts are provided, rearwardly of the front of the engine, between the stern drive unit and the boat hull, which mounts affording vertical trimming of the engine about a transverse axis rearwardly of the front of the engine in response to vertical trimming of the stern drive unit, i.e., raising and lowering of the front of the engine.

Also in accordance with the invention, there is provided means for sensing the vertical position of the forward end of the engine and for displaying to the operator such position or the equivalent trim position of the propeller.

Also in accordance with the invention, there is provided a boat having therein a stern drive unit including an engine mounted for selective tilting movement relative to the boat hull to provide propeller trim capability.

One of the principal objects of the invention is the provision of an arrangement for trimming a stern drive unit while independently retaining power tilting capability and whereby lowering of the stern drive unit to its fully lowered power tilt position will automatically return the stern drive unit to the previously adjusted trim condition.

Still another of the principal objects of the invention is the provision of a stern drive unit in accordance with the preceding paragraph including elastomeric vibration isolation mounting means between the stern drive unit and the boat hull for reducing vibration and noise transmission from the stern drive unit to the boat hull.

Still another of the objects of the invention is the provision of a stern drive unit including a motorized ack screw arrangement for tilting the stern drive unit elative to the boat hull to selectively obtain a desired ropeller trim condition.

Still another of the principal objects of the invention s the provision of a stern drive trimming arrangement which includes provision for sensing the trim condition f the stern drive unit and displaying such trim condi- ion information to the operator or user.

Still another object of the invention is the provision f a stern drive unit which advantageously provides elective propeller trim adjustment independently of ower tilting capability and which is relatively econom- cal to manufacture and install and which will provide eliable service over a long and useful life.

Other objects and advantages of the invention will ecome known by reference to the following descrip- ion and accompanying drawings.

DRAWINGS

FIG. 4 is a front elevational view, partially broken way and in section, of a portion of the stern drive unit hown in FIG. 1.

FIG. 5 is a fragmentary top view, partially broken way and in section, of the components shown in FIG. .

FIG. 6 is an enlarged fragmentary and partially sche- atic sectional view taken along line 6—6 of FIG. 3.

Figure 1:
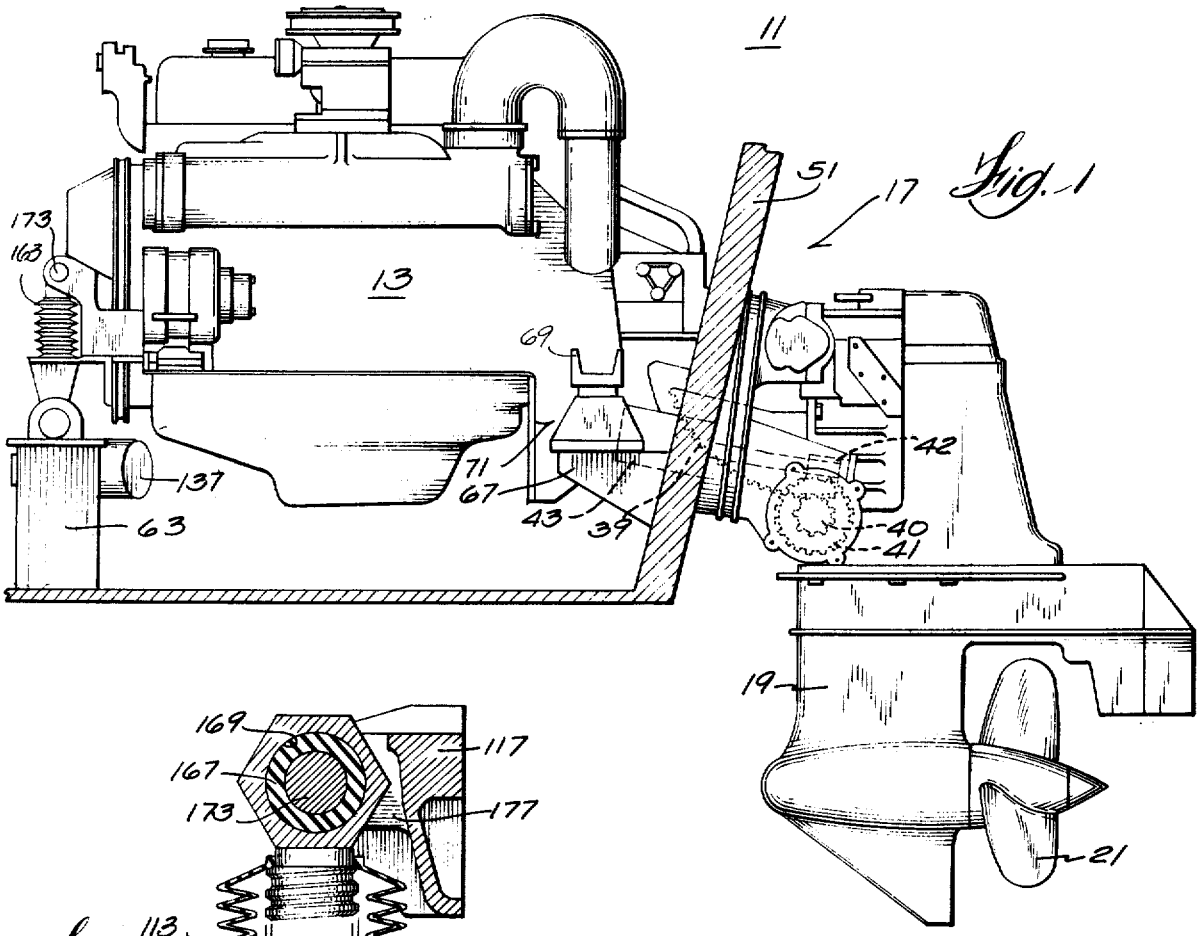
FIG. 1 is a side elevational view of a stern drive unit ounted in a boat hull in accordance with the inven- ion.

Before explaining the invention in detail, it is to be nderstood that the invention is not limited in its appli- ation to the details of construction and arrangement f parts illustrated in the accompanying drawings, since e invention is capable of other embodiments and of eing practiced or carried out in various ways. Also, it to be understood that the phraseology or [ ter- inoloty ] *terminology* employed herein is for the urpose of description and not of limitation.

DETAILED DESCRIPTION

Shown in the drawings is a marine propulsion stern rive unit 11 including an engine 13 and a propulsion g 17 fixedly connected to the engine 13 and including lower unit 19 which rotatably supports a propeller 21 d which is tiltable vertically, as well as horizontally vingable relative to the engine 13. Various propulsion g constructions can be employed. Preferably, the ropulsion or stern drive leg 17 includes a power tilting evice permitting raising of the lower unit 19 either artially or fully out of the water. In the disclosed con- ruction, the propulsion or stern drive leg 17 is con- ructed in general accordance with disclosures of the .S. Shimanckas U.S. Pat. No. 1,183,880 issued May 3, 1965, and entitled "Marine Propulsion Device", hich patent is incorporated herein by reference.

As used herein, the terms "propulsion leg" or "stern ive leg" encompass the Shimanckas intermediate nit "A", the Shimanckas swivel bearing support "C", and the Shimanckas propulsion unit "D" which are disclosed in the Shimanckas U.S. Pat. No. 3,183,880, Column 2, lines 69 through 72. It is noted that the stern drive leg disclosed by Shimanckas includes provision for power tilting including a segmented rack 39 which meshes with a pinion 40. In turn, the pinion 40 is connected to a worm gear 41 driven by a worm 42 on the armature shaft of a reversible motor 43 (The numerals 39 through 43 applied herein to the drawings, correspond to the numerals applied to the Shimanckas, U.S. Pat. No. 3,183,880). Also included in the disclosed construction is the Shimanckas slip clutch (numbered 45 in the Shimanckas patent), which clutch affords upward movement of the lower unit 19 in response to striking of an underwater obstacle.

As disclosed in the Shimanckas U.S. Pat. No. 3,183,880, the Shimanckas propulsion unit "D" is carried on, and for steerable movement relative to, the Shimanckas swivel bearing support "C" which, in turn, is carried by, and for relative vertical movement relative to, No. Shimanckas intermediate unit "A". In the disclosure of the Shimanckas U.S. Pat. No. 3,183,880, the intermediate unit "A" in turn was fixedly for from the boat hull through elastomeric cushions or mounts (numerals 21 and 25 in the Shimanckas patent) and the Shimanckas engine "B" was fixed to, and supported from, the Shimanckas intermediate unit "A". Thus, except for the vertical swinging movement of the assembly of the Shimanckas swivel bearing support "C" and propulsion unit "D" and except for the steering movement of the Shimanckas propulsion unit "D", the stern drive unit disclosed by Shimanckas was fixedly assembled and was mounted to the boat hull from the Shimanckas intermediate unit "A". Further, and except as noted, as disclosed in the Shimanckas U.S. Pat. [ No. 3,183,800 ] *No. 3,183,880* the stern drive unit was not movable relative to the boat hull.

In accordance with the invention disclosed herein, there is provided means for mounting the stern drive unit 11 on a boat hull 51 with the stern drive leg 17 extending through an opening (not shown) in the boat hull transom. The stern drive leg 17 can be connected to the transom to prevent entry of water in various ways including use of an inflatable member such as disclosed in the Shimanckas Application Ser. No. 55,665 filed July 17, 1970, and assigned to the assignee of this application.

In accordance with the invention, the stern drive mounting means also includes means 55 for selectively vertically displacing or tilting the forward end of the engine 13 about a rearward transverse axis and relative to the boat hull 51 and thereby to tilt the entire stern drive unit 11 relative to the boat hull 51 so as to obtain desired propeller trim conditions. Preferably, the stern drive unit mounting means includes forward and rearward vibration isolating elastomeric mounts between the stern drive unit 11 and the boat hull 51 so as to isolate the boat hull 51 from engine and other vibrations. It is preferable to arrange the rearward elastomeric mounts so as to permit tilting about the rearward mounts through a limited range affording the desired trim capability. The rearward vibration isolating mounts could be connected to either the stern leg 17 or to the engine 13. In the disclosed construction, the rearward mounts comprise transversely spaced elastomeric cushions connected between a rearwardly located engine frame member and the boat hull.

Figure 2:
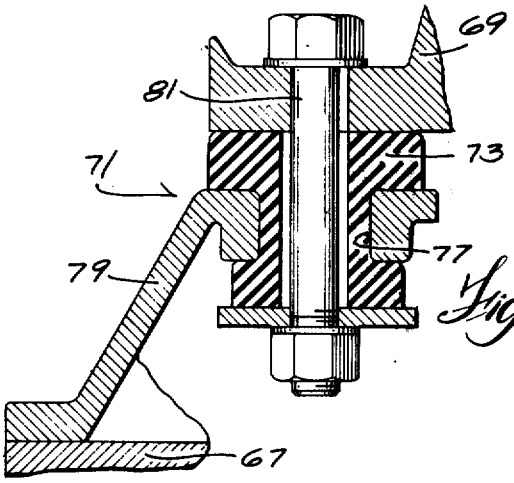
FIG. 2 is an enlarged fragmentary sectional view of a ibration insulation mount employed in the stern drive nit shown in FIG. 1.

More particularly, the boat hull 51 includes fore and aft fixed stringers or pads 63 and 67, respectively, to which the engine 13 is mounted. Still more specifically in this regard, the engine 13 includes, at its rear, a supporting frame member 69 to which are connected transversely aligned elastomeric mounts 71 which, in turn, are also connected to the boat hull stringer 67. In the illustrated and preferred construction, each of the isolation mounts 71 includes, as shown best in FIG. 2, a rubber mounting cushion or element 73 which can be as generally described in the Brown U.S. Pat. No. 3,532,319 issued Oct. 9, 1970. Specifically, the cushions 73 each include, intermediate their ends, a generally annular recess 77 receiving a mounting bracket 79 fixed to the boat hull stringer 67. In addition, the cushion 73 is connected to a bolt 81 which extends from an engine frame member 69 perpendicularly of the position of the bracket 79 connected to the cushion 73. As already noted, this construction affords pivoting of the engine 13 and other stern drive components about a rearwardly located transverse axis to accommodate trimming of the propeller relative to the boat hull 51 as may be desired.

As already noted, the engine mounting means includes means for selectively vertically displacing or tilting the forward end of the engine 13 relative to the boat hull 51 so as to thereby trim the propeller. Various arrangements can be employed to selectively raise and lower the forward end of the engine 13. For instance, a hydraulic ram could be employed. In the preferred and illustrated construction, there is employed a motorized jack screw 111 coupled with a vibration isolation mounting between the jack screw 111 and the engine 13.

Figure 3:
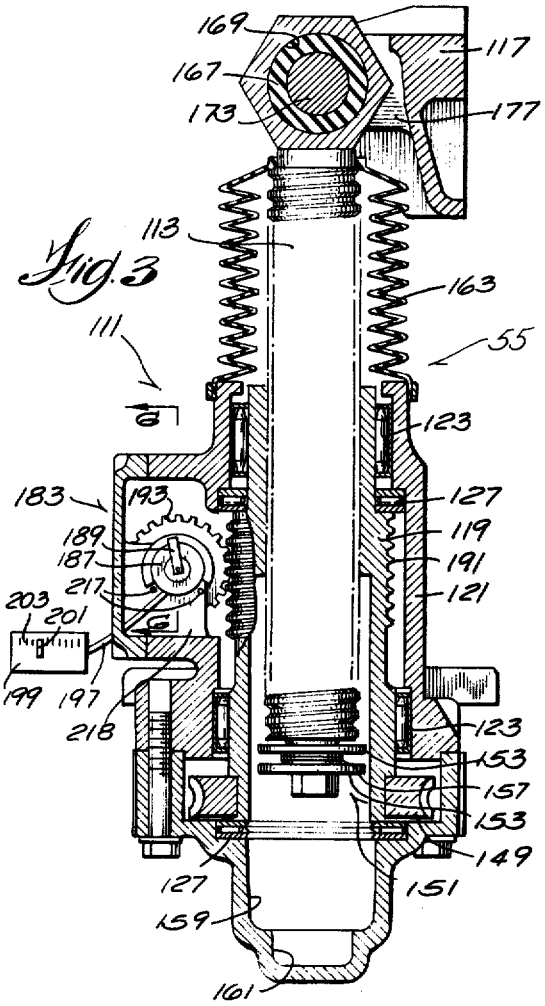
FIG. 3 is a fragmentary sectional view taken gener- lly along line 3—3 of FIG. 4 and including a schematic lustration of a propeller trim condition indicating eans.

More specifically, the jack screw 111 includes (See FIGS. 3, 4, and 5) an element in the form of an externally threaded screw 113 which is connected to an engine frame portion 117 to permit relative pivotal movement about a transverse or lateral axis and to prevent axial rotation of the screw [117] *111*. In turn, the screw [117] *111* is threadedly received in an internal bore of a member 119 which is rotatably carried in a housing by axially spaced radial bearings 123 and axially spaced thrust bearings 127.

In order to permit tilting of the housing 121 and jack screw 111 relative to the boat hull 51, the housing 121 includes (See FIG. 4) a pair of transversely extending arms 129 having bearing portions 131 received in transversely spaced pillow blocks or mounting brackets 133 fixed to the forward boat hull stringer 63, thereby affording pivotal movement about a transverse axis of the rotatable jack screw member 119 relative to the boat hull 51.

Means are provided for rotating the member 119 to raise and lower the forward end of the engine 13. While various arrangements can be employed, in the illustrated and preferred construction, rotation of the member 119 is provided (See FIG. 5) by a reversable electric motor 137 which is suitably mounted on the housing 121 and enclosed in a watertight boot 139 and which is drivingly connected to a stub shaft 141 carried in the housing 121 by axially spaced thrust bearings 143 and which includes a worm portion 147 in mesh with a worm wheel 149 fixed to the rotatable member 119 (See FIG. 3).

Means are provided for cushioning overtravel of the screw 113 relative to the rotatable member 119. While various arrangements can be employed, in the disclosed construction, a bumper stop 151 is provided by equipping the screw 113, at the end thereof received in the housing 121, with a pair of axially spaced stop washers 153 separated by a series of dished spring washers 157. The upper stop washer 153 is of such dimension as to be adapted, when the screw 113 is fully extended from the housing 121, to abut the margins of the opening in the housing 121 through which the screw 113 extends. At the lower end of the housing 121, there is provided a blind bore 159 which is adapted to receive the lower end of the screw 113 when the screw 113 is fully retracted into the housing 121. Extending from the blind bore 159 is a blind counterbore 161 which has a circumferential margin engageable by the lower stop washer 151 upon full retraction of the screw 113 into the housing 121. The spring washers 157 cushion and then stop the axial movement of the screw 113 upon engagement of the stop washers 151 with the housing 121.

In order to insure reliable operation over a long and useful life, a watertight bellows-type boot 163 is arranged in encircling relation about the portion of the screw 113 extending from the housing 121. The boot 163 is connected, at its upper end, to the screw 113 above the screw thread and, at its lower end, to the margin of the housing 121 around the opening through which the screw 113 extends.

Means are provided for vibrationally isolating the forward end of the engine 13 from the boat hull 51. While various other arrangements can be employed, in the preferred and illustrated construction as already indicated, there is provided (See FIGS. 3 and 4) and elastomeric cushion or mount 167 between the screw 113 and the engine frame portion 117.

More specifically, the upper end of the screw 113 includes a cylindrical eye or bore 169 which has a transverse axis and which has bonded or otherwise received therein the cylindrical rubber cushion or mount 167. The rubber mount 167 includes an axial bore 171 to which is bonded or otherwise received therein a shaft or pintle 173 which also extends through aligned bores in laterally spaced supporting arms 177 of the frame portion 117 which supports the engine 13. Suitable spacers 179 are provided between the arms 177 and the assembly of the screw 113 and the rubber mount or cushion 167. Axial displacement of the shaft 173 is prevented by snap retainers 181 engaged on the shaft 173 adjacent each of the ends thereof and exteriorly of the support arms 177.

Also in accordance with the invention, there is provided means 183 for sensing the vertical position of the forward end of the engine 13 and thereby the trim condition of the propeller 21, and for displaying such engine position information and therefor the propeller trim condition to the operator or user. While various arrangements can be employed in the preferred and illustrated construction, the engine position sensing and displaying means 183 comprises a potentiometer 187 mounted on the housing 121 and including a rotatable wiper 189 which is mechanically connected to the rotatable member 119 so as to reflect the position of the screw 113. More specifically, the rotatable member 119 also includes an externally threaded portion 191 which is in mesh with a gear 193 connected to the potentiometer wiper 189 so as to cause rotation of the wiper 189 in response to rotation of the rotatable member 119. Thus, rotation of the rotatable member 119 causes related movement of the potentiometer wiper

[119] *189* to vary the voltage output of the potentiometer 187 in accordance with the position of the forward end of the engine 13.

While various other arrangements could be employed, in the illustrated and preferred construction, the potentiometer 187 is electrically connected by electrical leads 197 to an indicating device 199 which can be located at the dashboard and in the vicinity of the steering wheel and which comprises a needle or indicator 201 positioned relative to a scale 203 in response to the voltage applied to the device from the potentiometer 187.

In accordance with the invention, means are also provided for self-calibrating the sensing and display means. While various other arrangements can be employed, in the disclosed construction shown in FIGS. 3 and 6, means are provided for limiting movements of the wiper 189 to an angular range corresponding to the full travel of the screw 113 as determined by the meshed engagement of the gear 193 with the threaded portion 191 of the rotatable member 119. In addition, selectively operably lost motion means is provided between the member 119 and the wiper 189. In the specifically illustrated construction, such means comprises a slip clutch 211 (See FIG. 6) between the gear 193 and the potentiometer 187. More specifically in this regard, a shaft 213 connects the potentiometer wiper 189 to the gear 193 for common movement and the slip clutch 211 comprises a bushing [255] *215* which is interposed between the shaft 213 and the gear 193 and which will normally transmit rotary movement from the gear 193 to the shaft. However, the bushing [213] *215* will slip relative to either or both of the gear 193 and the wiper 189 in the event the wiper 189 is restrained from pivotal movement.

The wiper movement restraining or limiting means comprises two spaced insulated pins or studs or posts 217 which are suitably mounted on a supporting bracket 218 and in spaced locations to limit or prevent angular movement of the wiper 189 beyond the full range associated with full travel of the screw 113. Accordingly, when the electric motor 137 is initially engaged to drive the screw 113 to one of its fully extended or fully retracted positions, the potentiometer wiper 189 will be rotated in the direction toward one of the posts 217. If the wiper 189 engages the post 217 toward which the wiper 189 is traveling before complete movement of the screw 113 to the end of its travel, the clutch 211 will slip so that when the screw 113 eventually reaches the end of its travel, the potentiometer wiper 189 is in the position at the end of its angular range of movement and in proper position reflecting the location of the screw 113. Thereafter, movement of the potentiometer wiper 189 away from the engaged post 217 will occur in response to movement of the screw 113 from its position at the end of its travel so as thereby to self-calibrate the sensing and display means.

In operation, energization of the reversable electric motor 137 causes selective vertical movement of the forward end of the engine 13 about a transverse axis provided by the rearward elastomeric cushion mounts 71. Such vertical tilting movement of the engine 13 causes accompanying movement of the lower unit 19 and trimming of the propeller 21 relative to the boat hull 51. At the same time, the lower unit 19 is capable of steering and tilting movement independently of the trim adjustment, thereby permitting the lower unit 19 to be raised and then fully lowered to the same adjusted trim position.

In addition to affording downward tilting return of the lower unit 19 to the same previously adjusted trim position, the disclosed construction also advantageously affords trim adjustment under way. Still further, the display means 198 is adapted to inform the operator at all times of the engine position or propeller trim condition.

Various of the features of the invention are set forth in the following claims.

What is claimed is:

[1. A stern drive unit comprising an engine, a stern drive leg fixed to said engine and including a part which is tiltable vertically and swingable horizontally independently of said engine, and means adapted for mounting said stern drive unit on a boat hull including means for selectively vertically tilting the forward end of said engine relative to the boat hull.]

2. A stern drive unit [in accordance with claim 1 wherein said means adapted for mounting said stern drive unit on the boat hull includes] *comprising an engine, a stern drive leg fixed to said engine and including a part which is tiltable vertically and swingable horizontally relative to said engine, and means adapted for mounting said stern drive unit on a boat hull including* elastomeric mounting means connected to said stern drive unit rearwardly of the front of said engine, said elastomeric mounting means providing a pivotal axis relative to which the forward end of said engine is movable, *and means connected to the front of said engine for selectively vertically tilting the forward end of said engine relative to the boat hull independently of vertical tilting of said part of said stern drive leg relative to said engine.*

3. A stern drive unit in accordance with claim [1] *2* wherein said means for selectively tilting the forward end of said engine includes an element connected to said engine and a member adapted to be connected to the boat hull, and means selectively extensibly connecting said element and said member.

4. A stern drive unit in accordance with claim 3 wherein said means for selectively tilting said engine includes a mounting arm adapted to be connected to the boat hull and wherein said element is connected to said engine so as to permit pivotal movement of said element relative to said engine about a lateral axis transverse of said engine and to prevent rotation of said element about an axis transverse to said lateral axis, and said element comprises a screw, and wherein said member is rotatably mounted from said mounting arm and includes a thread engaged with said screw.

5. A stern drive unit in accordance with claim 4 and further including a pair of pillow blocks adapted to be fixed to the boat hull, and a pivotal connection between said arm and said pillow blocks.

6. A stern drive unit in accordance with claim 4 wherein said member includes an axial bore and said thread is arranged internally of said bore, and said element extends into said bore and said screw is formed externally on said element.

7. A stern drive unit in accordance with claim 4 wherein said means for selectively tilting the forward end of said engine further includes a reversible drive motor mounted on said arm, and gearing connecting said member and said drive motor to afford rotation of said member in response to drive motor operation.

8. A stern drive unit in accordance with claim 7 wherein said arm has connected thereto a housing rotatably supporting said member and including an opening through which said element extends and an expansible boot connected to said housing around said opening and to the upper part of said element and encircling the portion of said element below said upper part and between said upper part and said housing.

9. A stern drive unit in accordance with claim 3 including an elastomeric connection between said element and said engine.

10. A stern drive unit in accordance with claim 4 including a pair of mounting brackets adapted to be fixed to the boat hull and a pivotal connection between said mounting brackets and said arm.

11. A stern drive unit [ in accordance with claim 1 and further including ] *comprising an engine, a stern drive leg fixed to said engine and including a part which is tiltable vertically and swingable horizontally independently of said engine, means adapted for mounting said stern drive unit on a boat hull including means connected to the front of said engine for selectively vertically tilting the forward end of said engine relative to the boat hull, and* means for sensing the position of the forward end of said engine, and means connected to said engine position sensing means *and located remotely from said engine* for displaying the position of said engine to the operator of the boat.

12. A stern drive unit in accordance with claim 11 wherein said means for selectively tilting the forward end of said engine includes an element connected to said engine so as to permit pivotal movement between said engine and said element about a lateral axis and to prevent rotation of said element about an axis perpendicular to said lateral axis, and a member adapted to be pivotally and rotatably mounted relative to the boat hull, and a threaded connection between said element and said member.

13. A stern drive unit in accordance with claim 12 wherein said means for sensing the position of said engine includes a potentiometer having a displaceable wiper and means for mechanically connecting said wiper to said member for positioning said wiper in response to rotation of said member.

14. A stern drive unit in accordance with claim 13 wherein said wiper is rotatably mounted, and wherein said means mechanically connecting said wiper and said member comprises a gear connected to said wiper, and an external thread on said member in mesh with said gear.

15. A stern drive unit in accordance with claim 14 wherein said display means includes an indicating device movably responsive to applied voltage and electrical connections between said indicating device and said potentiometer so as to vary the voltage applied to said indicating device in response to the position of said wiper.

[16. A boat comprising a boat hull, an engine, a stern drive leg fixed to said engine and including a part which is tiltable vertically and swingable horizontally independently of said engine, and means mounting said stern drive unit on said boat hull including means for selectively vertically displacing the forward end of said engine relative to the rear of said engine.]

17. A boat [ in accordance with claim 16 wherein said means mounting said stern drive unit on said boat hull includes ] *comprising a boat hull, an engine, a stern drive leg fixed to said engine and including a part which is tiltable vertically and swingable horizontally relative to said engine, and means mounting said stern drive unit on said boat hull including* elastomeric mounting means connected to said stern drive unit rearwardly of the front of said engine and to said boat hull, said elastomeric mounting means providing a pivotal axis relative to which the forward end of said engine is movable, *and means connected to the front of said engine for selectively vertically displacing the forward end of said engine relative to the rear of said engine independently of vertical tilting of said part of said stern drive leg relative to said engine.*

18. A boat in accordance with claim 17 wherein said elastomeric mounting means is connected between the rear of said engine and said boat hull.

19. A boat in accordance with claim 17 wherein said means for selectively displacing the forward end of said engine includes an element connected to said engine and a member connected to said boat hull, and means selectively extensibly connecting said element and said member.

20. A boat in accordance with claim 19 wherein said element is connected to said engine so as to permit pivotal movement of said element relative to said engine about a lateral axis transverse of said engine and to prevent rotation of said element about an axis transverse to said lateral axis, wherein said element comprises a screw, and wherein said member is rotatably mounted and includes a thread engaged with said screw.

21. A boat in accordance with claim 20 wherein said member includes an axial bore and said thread is arranged internally of said bore, and said element extends into said bore and said screw is formed externally on said element.

22. A boat in accordance with claim 20 wherein said means for selectively displacing the forward end of said engine further includes a reversible drive motor and gearing connecting said member and said drive motor to afford rotation of said member in response to drive motor operation.

23. A boat in accordance with claim 22 including a housing rotatably supporting said member and including an opening through which said element extends and an expansible boot connected to said housing around said opening and to the upper part of said element and encircling the portion of said element below said upper part and between said upper part and said housing.

24. A boat in accordance with claim 19 including an elastomeric connection between said element and said engine.

25. A boat in accordance with claim 19 including a pivotal connection between said boat hull and said member.

26. A boat [ in accordance with claim 16 and further including ] *comprising a boat hull, an engine, a stern drive leg fixed to said engine and including a part which is tiltable vertically and swingable horizontally independently of said engine, means mounting said stern drive unit on said boat hull including means connected to the front of said engine for selectively vertically displacing the forward end of said engine relative to the rear of said engine, and* means for sensing and for *remotely* displaying the position of said engine to the operator of the boat.

27. A boat in accordance with claim 26 wherein said means for selectively displacing the forward end of said engine includes an element connected to said engine so is to permit pivotal movement between said engine and said element about a lateral axis and to prevent rotation of said element about an axis perpendicular to said lateral axis, a member pivotally and rotatably mounted relative to said boat hull, and a threaded connection between said element and said member.

28. A boat in accordance with claim 27 wherein said means for sensing the position of said engine includes a potentiometer having a displaceable wiper, and means for mechanically connecting said wiper to said member for positioning said wiper in response to rotation of said member.

29. A boat in accordance with claim 28 wherein said wiper is rotatably mounted, and wherein said means mechanically connecting said wiper and said member [ comprising] *comprises* a gear connected to said wiper, and an external thread on said member in mesh with said gear.

30. A boat in accordance with claim 29 wherein said displaying means includes an indicator device movably responsive to a voltage applied thereto and electrical connections between said indicator device and said potentiometer so as to vary the voltage applied to said indicator device in response to the position of said wiper.

31. A boat in accordance with claim 26 including means for self-calibrating said means for sensing and displaying the engine position.

32. A boat in accordance with claim 31 wherein said means for selectively displacing the forward end of said engine includes an element connected to said engine so as to permit pivotal movement between said engine and said element about a lateral axis and to prevent rotation of said element about an axis perpendicular to said lateral axis, a member pivotally and rotatably mounted relative to said boat hull, and a threaded connection between said element and said member to afford movement of said element in response to member rotation between spaced positions at the respective ends of the travel of said element, wherein said means for sensing the position of said engine includes a potentiometer having a displaceable wiper, and means for mechanically connecting said wiper to said member for positioning said wiper in response to rotation of said member, and wherein said self-calibrating means includes means engageable by said wiper for limiting the range of movement of said wiper and means for providing lost motion between said wiper and said member in the event that said wiper movement limiting means is engaged by said wiper and said element is spaced from both of said spaced positions.

*33. A marine propulsion device including a first part adapted to be fixedly mounted on a hull of a boat, a second part connected to said first part for angular movement relative to said first part in a vertical path and including a member rotatably movable relative to said first part in accordance with the angular movement of said second part relative to said first part, said member including thereon an external thread, and means connected to said second part and operable in response to movement of said second part along said path for remotely indicating the angular location of said second part relative to said first part, said means for remotely indicating the angular location of said second part relative to said first part including a potentiometer having a rotatably mounted wiper, a gear connected to said wiper for common rotation and in mesh with said external thread on said member for positioning said wiper in response to rotation of said member, and means connected to said potentiometer for displaying the position of said second part relative to said first part to the operator of the boat.*

*34. A marine propulsion device in accordance with claim 33 wherein said means for displaying includes an indicating device movable responsive to applied voltage and electrical connections between said indicating device and said potentiometer so as to vary the voltage supply to said indicating device in response to the position of said wiper.*

*35. A marine propulsion device in accordance with claim 33 and including means for self-calibrating said means for remotely indicating the position of said second part relative to said first part.*

* * * * *